D.C. MAGNETIC AMPLIFIER

Filed Nov. 27, 1956 5 Sheets-Sheet 1

INVENTOR.
JOSEPH MONTNER
BY Walter J. Jason
ATTORNEY

D.C. MAGNETIC AMPLIFIER

Filed Nov. 27, 1956 5 Sheets-Sheet 2

INVENTOR.
JOSEPH MONTNER

BY Walter J. Jason

ATTORNEY

INVENTOR.
JOSEPH MONTNER
BY Walter J. Jason
ATTORNEY

INVENTOR.
JOSEPH MONTNER
BY Walter J. Jason
ATTORNEY

INVENTOR.
JOSEPH MONTNER
BY
[signature]
ATTORNEY 3,014,185

D.C. MAGNETIC AMPLIFIER

Joseph Montner, Whittier, Calif., assignor to General Dynamics Corporation, San Diego, Calif., a corporation of Delaware Filed Nov. 27, 1956, Ser. No. 624,601
6 Claims. (Cl. 330—8)

This invention relates generally to amplifiers; more particularly, it relates to magnetic amplifiers which may be utilized with electrical input signals or with positionable mechanical members to reflect external physical conditions.

Presently known D.C. amplifiers are characteristically subject to drift. Where it is desired to obtain polarity reversible D.C. amplification with minimum drift, a conventional method is to utilize a mechanical or electronic chopper to convert the input signal into a pulsating unidirectional signal. This pulsating signal is amplified by alternating current amplifying techniques. The amplifier output is then rectified and filtered to produce an amplified unidirectional voltage output corresponding in form to the D.C. input signal. This method does not provide correlation of polarity between the input and output, unless additional circuitry is provided for converting the output voltage so that its polarity corresponds to the polarity of the input signal.

Although induction potentiometers of the prior art have been used for purposes of greater reliability, high signal-to-noise ratio and greater resolution, their output voltages are phase-reversible A.C. voltage without substantial power. Such induction potentiometers usually employ a slug of soft iron so arranged that by positioning it, better transformer coupling can be provided between a first set of windings than between a second set of windings. Comparison circuitry must be provided in order to obtain a phase-reversible D.C. output.

In contrast with D.C. amplifiers of the prior art, the present invention provides D.C. amplification with a minimum of drift, without requiring a separate chopper and without requiring phasing circuitry for producing polarity correlation between output and input. Where the present invention is adapted for translating a physical condition, such as a mechanical position, into an appropriate voltage signal, the core of the magnetic amplifier may be biased directly from a positioned reference member, in the form of a permanent magnet, and an output may be obtained which is phase sensitive and correlated with the directional sense of the input.

Briefly described, one form of the present invention includes a saturable reactor having two cores, means for varying the bias on the cores, an output winding, an A.C. excitation winding and a non-linear threshold element in the output circuit. In the D.C. magnetic amplifier version of this invention, the input winding may be connected to a source of D.C. signal voltage, the excitation winding being connected to a source of A.C. voltage to provide core excitation. In the inductive potentiometer version of this invention, biasing of the cores is accomplished by the mechanical positioning of magnetic members rather than by an electric input signal; the excitation winding is connected to an A.C. source as in the amplifier version. Regardless of the means employed for biasing the cores, there are produced in the output winding unidirectional second harmonic pulses having polarity and duration which are respectively determined by the direction and magnitude of the biasing of the cores. These output pulses, which have a greater amplitude in one direction than in another, are fed into a threshold device in the form of a nonlinear impedance in series with the load. The nonlinearity of this impedance is such that voltages of relatively high amplitudes are passed and voltages of low amplitudes are blocked. Therefore, unidirectional pulses are passed by the threshold device to the output or load, the polarity of the pulses depending upon the direction of bias of the cores. The result is an electrical output having a phase sense indicative of the phase sense of the electrical input or to the directional sense of the mechanical input, whichever the case may be. It thus becomes apparent that one simple stage performs the functions of a D.C. chopper or converter, an amplifier, and a detector. In the embodiment of the invention wherein biasing of the cores is accomplished by the mechanical positioning of magnets, such a stage also performs the function of an induction potentiometer.

It is, therefore, a principal object of the present invention to provide a D.C. amplifier utilizing novel detection means whereby D.C. signal voltage, converted into voltage pulses, in the form of relatively narrow "spikes" having duty cycles considerably less than 50%, may be amplified by means of conventional amplifiers and detected into proper D.C. polarity without extra phasing circuitry.

It is an object of this invention to provide a D.C. amplifier which can readily and effectively be adapted for use as transducer.

It is another object of this invention to provide a D.C. magnetic amplifier which is less subject to drift than conventional D.C. amplifiers and which provides minimized drift with a minimum of components.

It is an object of this invention to provide a convenient and improved D.C. amplifier wherein the chopping, amplification and phase detection functions are performed in one stage, thereby reducing weight, size and cost.

It is an object of the present invention to provide a magnetic amplifier which provides phase sensitive signal amplification without the necessity of phase referencing after amplification.

It is another object of this invention to provide a D.C. magnetic amplifier for producing unidirectional voltage pulses having duration and polarity depending respectively upon input signal amplitude and polarity.

Another object of the present invention is the provision of a D.C. amplifier for converting a steady D.C. voltage input to an output having voltage pulses of polarity indicative of the polarity of the D.C. input and of duration depending upon the amplitude of the D.C. input.

It is a further object of the present invention to provide an electromechanical transducer, the power output of which is available as phase sensitive D.C. voltage or current.

It is a further object to provide a D.C. magnetic amplifier wherein the polarity and amplitude of the output is controlled by controlling the bias on magnetic cores.

It is a further object to provide a magnetic amplifier wherein the magnetic cores are biased in polarity and in amount corresponding to the positions of movable members, thereby governing the polarity and amplitude of the amplifier output.

It is a still further object of this invention to provide a filtering network in the output of the D.C. magnetic amplifier for providing an amplified image of the signal input to the amplifier.

Other objects and features of the present invention, as well as many advantages thereof, will be readily apparent to those skilled in the art from a consideration of the following specification, the appended claims, and the accompanying drawings in which:

Figure 1:
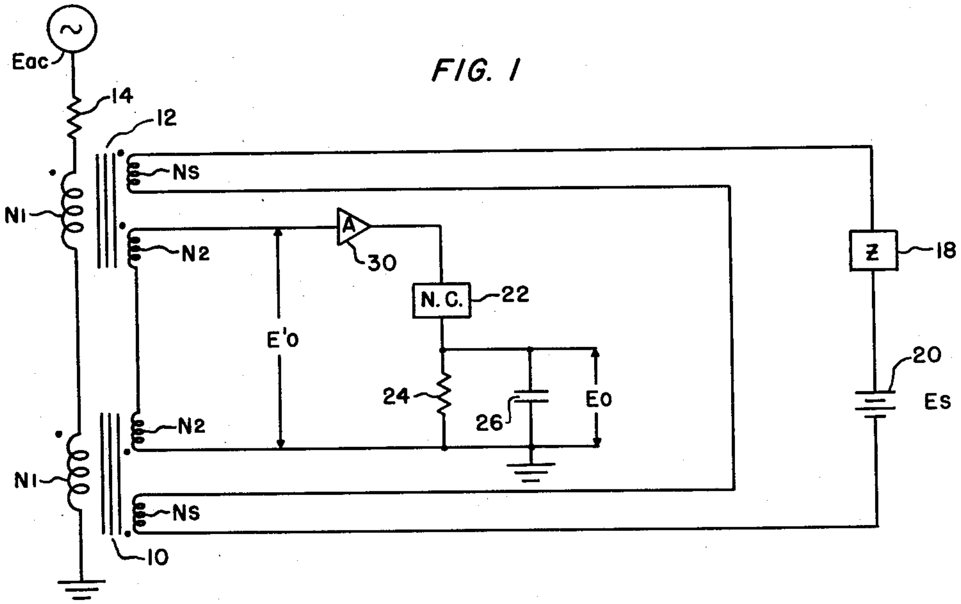
FIGURE 1 shows a schematic circuit diagram of a D.C. magnetic amplifier according to the present invention, wherein a D.C. signal voltage is used to bias the cores of a saturable reactor.
Figure 3A:
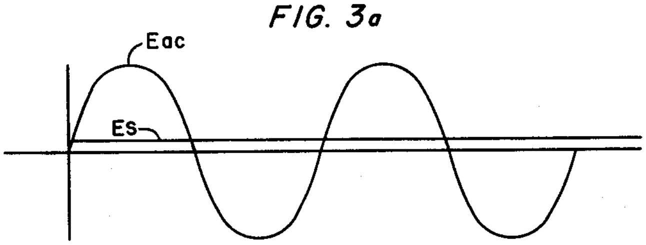
Figure 3B:
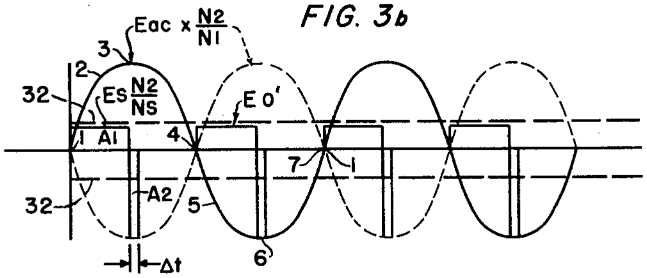
Figure 3C:
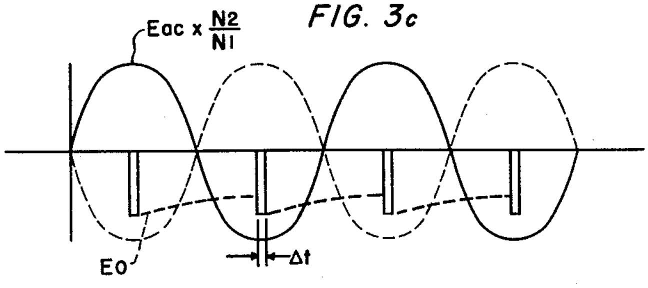
Figure 4:
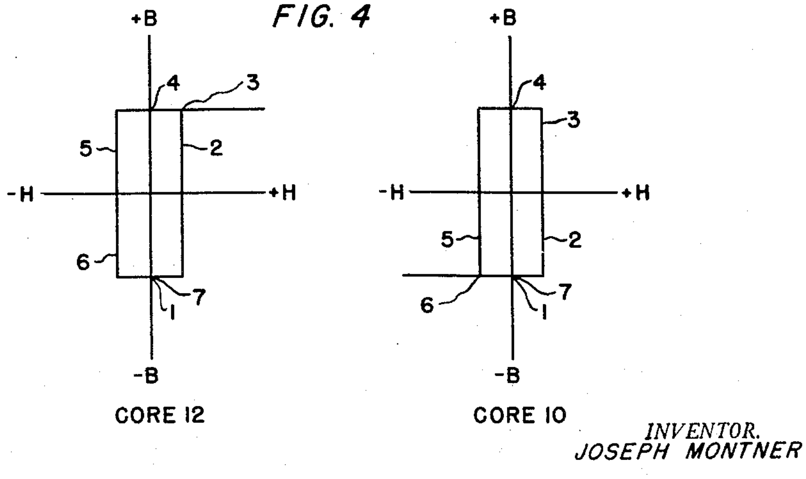
Figure 5:
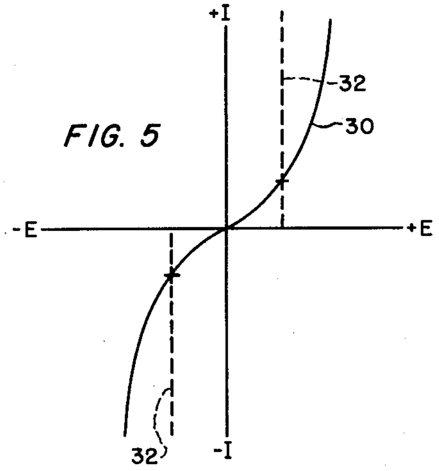
Figure 6:
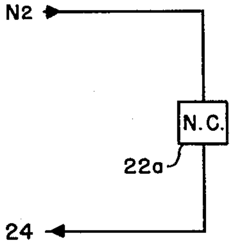
Figure 7:
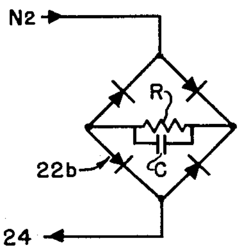
Figure 8:
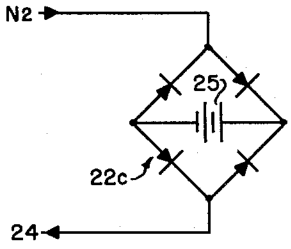
Figure 9:
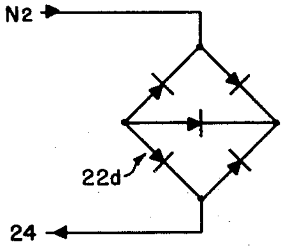
Figure 10:
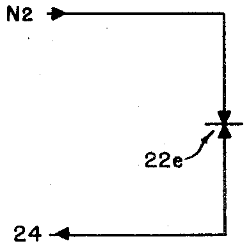
Figure 11:
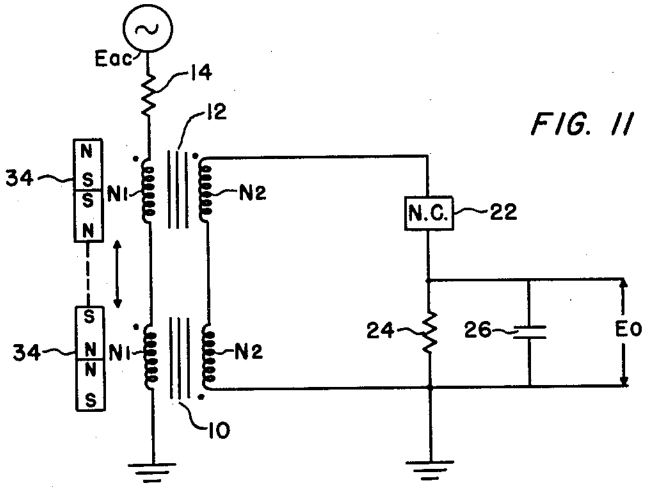
Figure 12:
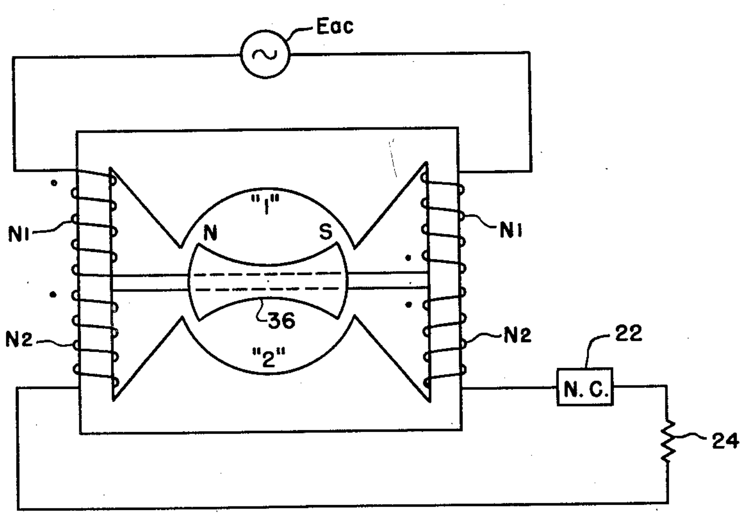
Figure 13:
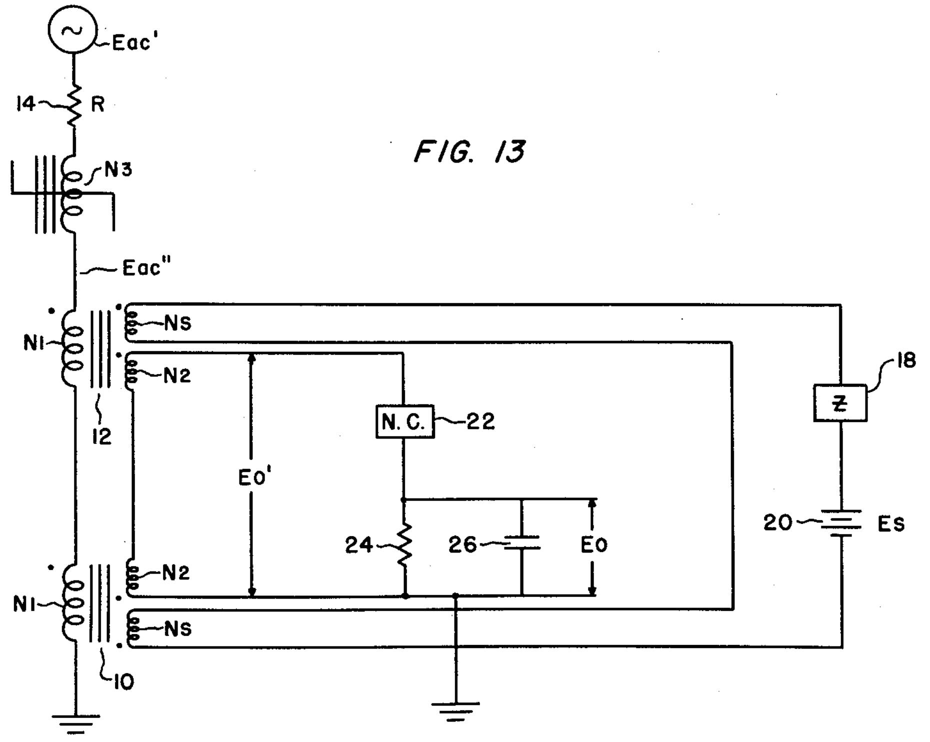
Figure 14:
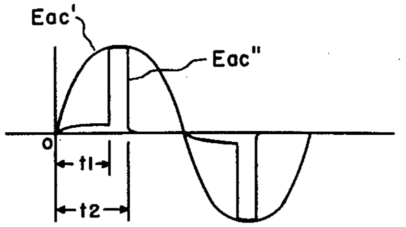

FIGURES 3*a*, 3*b* and 3*c* show the voltage waveforms at certain points of the circuit shown in FIGURE 1;

FIGURE 4 shows the hysteresis-loop characteristic of the cores 10 and 12 shown in FIGURE 1;

FIGURE 5 shows the volt-ampere characteristic curves of certain types of non-linear impedance elements or circuits;

FIGURES 6, 7, 8, 9 and 10 show circuits and elements having the characteristics represented by the curves of FIGURE 5;

FIGURE 11 shows an inductive potentiometer using the principles of the present invention;

FIGURE 12 shows a modified form of induction potentiometer of the present invention using a rotatable magnet;

FIGURE 13 shows a modification of the D.C. magnetic amplifier of the present invention, wherein an additional saturable reactor is utilized; and FIGURE 14 shows the waveform produced by the modification shown in FIGURE 13.

Referring now to the drawings, and more particularly to FIGURE 1, there is shown a preferred embodiment of the present invention. Two toroidal cores, 10 and 12, constructed of a relatively square hysteresis-loop material are energized by series connected A.C. excitation windings $N_1$. A protective current-limiting resistor 14 is provided. Signal windings $N_s$ are serially connected with impedance 18 (Z) and D.C. signal source 20 ($E_s$), as shown. Signal windings $N_s$ are wound in opposite directions on cores 10 and 12. The signal windings are so phased that the fundamental line voltage tends to cancel out in the signal circuit. Load windings $N_2$ are similarly wound and phased, so that the fundamental or line voltage tends to cancel or "buck out." A threshold device or non-linear impedance 22 and load resistor 24 are serially connected with load windings $N_2$. Filter capacitor 26 across load resistor 24 provides a filtered D.C. output voltage. A.C. amplifier 30 provides additional amplification if desired.

Line voltage $E_{ac}$ is selected with a large enough value, or the number of turns of excitation windings $N_1$ is sufficiently small, that A.C. saturation of cores 10 and 12 occurs at a predetermined point substantially before the end of each half cycle of the line voltage $E_{ac}$. With no signal $E_s$ from source 20 being applied, the D.C. voltage $E_o$ induced into the load side by $E_{ac}$ tends to be zero because of the canceling effects of windings $N_2$. Voltage $E_o$ also tends to be zero after A.C. saturation of both cores occurs, because there is then no transformer action. Resistor 14 then holds or absorbs the entire voltage when the cores are at saturation. It should be noted that the explanation herein proceeds on the assumption that core windings $N_2$ are matched so that they will saturate at substantially the same time.

Because each of coils $N_2$ holds or supports the same voltage and saturates or fires at substantially the same time, the net voltage $E_o'$ across windings $N_2$ is zero when there is no signal voltage $E_s$. A positive signal voltage, $+E_s$, causes the saturation of core 12 to be advanced in time with respect to core 10 during the positive half cycles of voltage $E_{ac}$, and to cause the saturation of core 10 to be advanced in time with respect to that of core 12 during the negative half cycles. A negative signal voltage $-E_s$, will cause a reversal of these saturation time relationships. A voltage pulse which, by transformer action, delivers power to load 24 occurs during the time interval $\Delta t$ between the times of saturation of cores 10 and 12.

In FIGURE 3 are shown the voltage waveforms which are produced at certain points in the circuit shown in FIGURE 1. Figure 3*a* shows the A.C. line voltage $E_{ac}$ and a D.C. input signal $E_s$. Figure 3*b* shows the voltage waveform $E_o'$, the net voltage which occurs across windings $N_2$, for the case where A.C. saturation of cores 10 and 12 is set to occur at a point approximately 90° of the cycle of line voltage $E_{ac}$ when a signal $E_s$ is applied. Voltage $E_o'$ in Figure 3*b*, where it represents the height of area $A_1$ is the voltage produced across windings $N_2$ by a positive D.C. input signal $E_s$ by transformer action between signal windings $N_s$ and load windings $N_2$, when cores 10 and 12 are not saturated. This voltage, representing the height of area $A_1$, suddenly terminates when one core becomes saturated before the other because of signal bias. When one core becomes saturated, the A.C. winding $N_1$ on the as yet unsaturated core is connected to a low resistance source, resistance 14. There is only the transformer action from winding $N_1$ to winding $N_2$ in the unsaturated core. This produces voltage pulse $A_2$. Area $A_2$ represents the voltage for the short interval of time between the time of saturation of one core and the time of saturation of the other core. This refers to A.C. saturation. Because area $A_2$ must equal area $A_1$ (the net D.C. voltage through a transformer being zero), the amplitude of $A_2$ is necessarily relatively large, since its time interval is short. Impedance 18 (Z) is selected to present a large impedance to a pulse voltage, such as, represented by area $A_2$.

Figure 2:
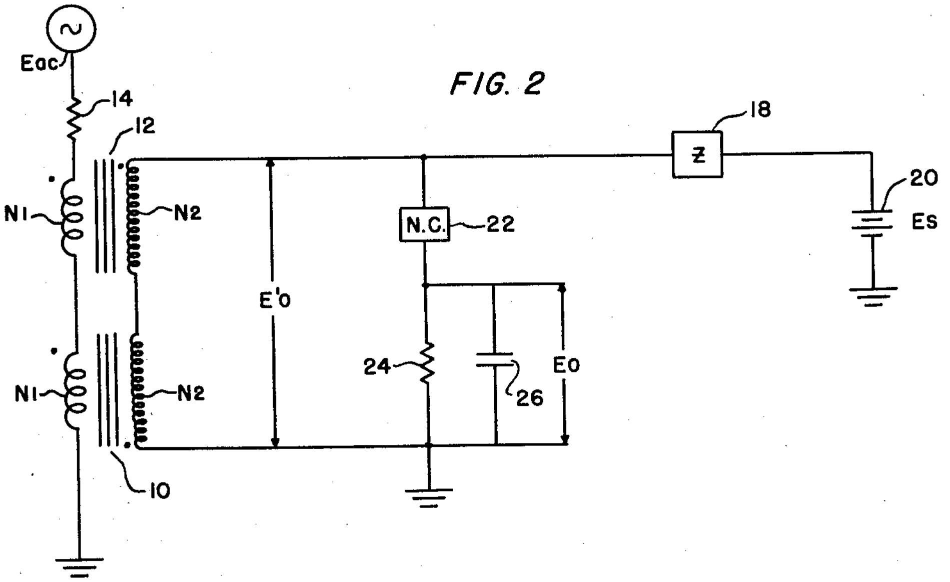
FIGURE 2 shows a modification wherein common load and signal windings are used.

Referring now to FIGURE 2, there is shown a modification of the present invention wherein the signal $E_s$ is connected directly to load windings $N_2$. The net effect is the same since the signal voltage $E_s$ on windings $N_2$ varies with core saturation in the same manner as if it were supplied through the transformer effect of the embodiment shown in FIGURE 1.

In FIGURE 4 are shown hysteresis-loops for cores 10 and 12, these cores being shown in FIGURE 1. Certain points on each hysteresis curve are designated by numbers and the corresponding numbers are indicated on the waveform of FIGURE 3*b*. A clear understanding of the hysteresis effects and the manner in which they produce the voltage pulses shown in FIGURE 3*b* may be had by a careful examination of FIGURE 4 in conjunction with FIGURE 3*b*. Thus, at the beginning of the positive A.C. cycle (point 1 in FIGURE 3*b*) the core saturation of cores 10 and 12 corresponds to point 1 of FIGURE 4. At point 2 on the cycle core 12 leads core 10 toward saturation by the difference in points 2 on each loop. At point 3 on the A.C. cycle, core 12 is driven into saturation and its winding $N_2$ can no longer furnish a voltage in opposition to the A.C. voltage impressed on $N_2$ of core 10. Since core 10 is not yet in saturation it continues to produce flux changes and to generate a voltage across winding $N_2$ by transformer action from winding $N_1$. As previously stated, during this time $\Delta t$, an unopposed pulse $E_o'$ is developed. At point 4 and throughout the top, flat portions of the hysteresis-loops, the cores are still saturated and there is no voltage output. At point 5 on the cycle the other core 10 is leading core 12 into the negative saturation region. The $E_s$ signal is still of the same polarity and therefore still presents a D.C. voltage across the windings $N_2$ of the same polarity as before. At point 6 on the cycle core 10 is driven into negative saturation while core 12 is still inducing a voltage in its winding $N_2$. As before, an unopposed voltage $E_o'$ is developed. Since the pulse is of opposite polarity from the other one, and since the winding is also reversed, the net effect in the output is a pulse in the same direction as the first.

Non-linear impedance or threshold device 22 must have the characteristic of suppressing voltages of low magnitudes and of passing voltages of relatively larger magnitudes. The characteristic curves of certain non-linear impedances are shown in FIGURE 5. FIGURES 6, 7, 8 and 9 show certain conventional elements which have such characteristics. The curved characteristic 30 shown in FIGURE 5 is produced by a thyrite $22_a$, represented in FIGURE 6, or by a self-biased diode bridge $22_b$ shown in FIGURE 7. The square or ideal characteristic 32 shown in FIGURE 5 is that of a battery biased diode bridge $22_c$ shown in FIGURE 8, a Zener-biased diode bridge $22_d$ shown in FIGURE 9, or two Zener diodes connected back to back as represented by $22_e$ in FIGURE 10. The voltage furnished by voltage supply 25 of bridge $22_c$ is at least equal to the amplitude of the voltages to be removed from the output. FIGURE 3*c* shows the wave shape of voltage $E_o$ across load 24. Lines 32 in FIGURE 3*b* represent minimum voltage values under which the non-linear threshold device will not conduct. Thus, the voltage amplitude indicated by $A_1$ has been entirely suppressed by non-linear impedance 22, but the major portion of the voltage indicated by $A_2$ has passed to the load. This produces a D.C. output voltage $E_o$, shown in FIGURE 3*c*, having a large magnitude.

It is obvious that where the D.C. input signal $E_s$ has a polarity opposite to that assumed hereinbefore, area $A_1$, area $A_2$ and output voltage $E_o$ are correspondingly reversed in polarity. Thus, it is seen that no rectifier and phase sensing circuitry is needed to indicate or sense the polarity of the input signal $E_s$ in the output voltage $E_o$.

The D.C. current flow through windings $N_2$ and through load 24 is produced despite the fact that non-linear element 22 is symmetrical. Thus in effect, direct current is passed through a transformer.

Increasing the magnitude of D.C. input signal $E_s$ produces a corresponding increase in time interval $\Delta t$ between the times of saturation of cores 10 and 12. An increase in time interval $\Delta t$ permits a longer load current flow to thereby charge the capacitor 26 for a longer period of time. This increases the magnitude of output voltage $E_o$. Because of relatively large leakage inductances pure peak detection is not possible. Therefore, there is excellent linearity among D.C. input signal $E_s$, the length of time interval $\Delta t$ and output voltage $E_o$.

Referring now to FIGURE 11, there is shown an embodiment of the present invention which is adapted for use as an inductive potentiometer to produce relatively large power output and to produce a phase sensitive D.C. output voltage corresponding to the positions of permanent magnets which are moveable in response to external physical movement indicated by force F. These magnets are arranged to provide biasing of two sensitive magnetic cores. This embodiment produces the wave forms shown in FIGURE 3 and which are hereinbefore described in connection with the embodiment shown in FIGURE 1. Permanent magnets 34 provide biasing in opposite directions to produce a difference $\Delta t$ in saturation times of the cores similar to that provided by the application of D.C. input signal $E_s$ to signal windings $N_s$ (shown in FIGURE 1). Two advantages of this embodiment of the present invention over conventional inductive potentiometers are that relatively large power output is obtainable and that positive or negative voltage output is obtainable without the necessity of extra demodulation circuitry for retrieving the proper phase of the D.C. output, as is necessary with conventional A.C. output inductive potentiometers. Another advantage is that there is no "dead" zone in the region of zero signal level.

In FIGURE 12 is shown an embodiment of the present invention which employs a rotatable magnet. This modification is adapted for use as an inductive potentiometer. Magnet 36 rotates in response to external physical movement. When the N pole is in the area or position indicated by the numeral "1," the voltage output pulses across load resistor 24 have a predetermined polarity; when the N pole is in the area designated by the numeral "2," these output spikes have the opposite polarity.

Those skilled in the art will realize that a number of modifications may be made without departing from the essential features of the present invention. The embodiments indicated in FIGURES 13 and 14 are an example of such a modification. In order to provide efficient and maximum utilization of greater line voltages, an additional reactor $N_3$ is connected in series with A.C. excitation windings $N_1$, as shown in FIGURE 13. As previously indicated, the voltage $E_o'$ in FIGURE 1 is normally of the shape shown in FIGURE 3*b*. The range of D.C. output voltage $E_o$ depends (among other things) upon the magnitude of the peaks of voltage $E_o'$. If the saturation angle of cores 10 and 12 is to remain the same with a greater line voltage $E_{ac}'$, the number of turns for load windings $N_2$ must be increased. Increasing the number of turns is not always practicable because of space restrictions and because of an increase in the leakage impedance of windings $N_2$ to the sharp voltage peaks of voltage $E_o'$. Further, if increased line voltage $E_{ac}'$ is applied without increasing the number of turns of windings $N_2$, cores 10 and 12 saturate sooner and the voltage peaks of $E_o'$ are not appreciably larger than before, because the firing angle is less at a greater line voltage. Additional reactor $N_3$ in FIGURE 13, having a square hysteresis-loop characteristic, is wound with such a number of turns that it holds an increased line voltage $E_{ac}'$ until some selected time in the cycle, as shown in FIGURE 14. Time $t_1$ in FIGURE 14 represents the time during which reactor $N_3$ saturates. When saturation occurs, almost the entire line voltage $E_{ac}'$ is impressed across windings $N_1$. Since the increased line voltage $E_{ac}'$ is much greater than that previously used, saturation occurs sooner (in time interval $t_2-t_1$). The result of this action is that the normal A.C. sinusoidal waveshape driving the D.C. magnetic amplifier has been changed to a new voltage $E_{ac}''$, shown in FIGURES 13 and 14. The new voltage $E_{ac}''$ will develop higher peaks at $E_o'$ and will permit the signal to produce a preselected biasing effect between one core and the other from time $t=0$ to time $t \geqq t_1$. More range in D.C. output voltage $E_o$ is thereby obtainable. Reactor $N_3$ may be regarded as a pulse generator that generates A.C. frequencies higher than $E_{ac}'$. Since the voltage output range of a magnetic amplifier normally can increase with higher excitation frequencies, this is a convenient method for generating these higher frequencies.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What I claim is:

1. A D.C. magnetic amplifier comprising first and second saturable cores, a pair of excitation windings in series arrangement and each wound on one of said cores in the same direction, said arrangement being adapted to be connected to an A.C. voltage source, means adapted to be responsive to an input for generating magnetic flux corresponding to said input in the respective cores simultaneously in opposite directions, said cores being driven into saturation in one direction by the positive half-cycle of A.C. voltage from said source at different points of said half-cycle depending upon the magnitude and polarity of said input, said cores being driven into saturation in the opposite direction by the negative half-cycle of said A.C. voltage at different points of said negative half-cycle depending upon the magnitude and polarity of said input, said first core reaching saturation in said one direction before said second core, said second core reaching saturation in said opposite direction before said first core, a pair of output windings in series arrangement and each wound on one of said cores in the opposite direction to substantially cancel voltages induced therein when neither core is saturated, said output windings having current flow in a direction determined by the polarity of said input when said first core is saturated in said one direction and said second core is non-saturated, and said output windings having current flow in the same direction when said second core is saturated in said opposite direction and said first core is non-saturated, to produce voltage pulses of one polarity determined by the polarity of said input, a non-linear impedance threshold device having symmetrical positive and negative current conduction voltage characteristics, and a load in series arrangement with said threshold device, said series arrangement of said threshold device and load being connected across said series arrangement of said output windings, said threshold device being responsive to voltages of either polarity across said output windings having magnitudes at least equal to said conduction voltage to provide current conduction therethrough and said load, and passive to voltages of either polarity across said output windings having magnitudes less than said conduction voltage to prevent current conduction therethrough and said load, whereby the output voltage developed across said load due to current conduction therethrough corresponds to said input.

2. A D.C. magnetic amplifier according to claim 1 further comprising filter means connected across said load to provide filtering of said output voltage.

3. A D.C. magnetic amplifier according to claim 1, wherein said magnetic flux generator means comprises a pair of signal windings in series arangement and each wound on one of said cores in the same direction as the output winding on the same core, said series arangement of signal windings being adapted to be connected to a D.C. signal input.

4. A D.C. magnetic amplifier according to claim 1, wherein said magnetic flux generator means comprises means for applying a D.C. input signal across said series arrangement of output windings.

5. A D.C. magnetic amplifier according to claim 1, wherein said magnetic flux generator means comprises a set of magnets adjacent to said cores and movable relative thereto in response to an external force corresponding to an input.

6. A D.C. magnetic amplifier according to claim 1, wherein said magnetic flux generator means comprises a magnet rotatable between said cores in response to an external force corresponding to an input.

References Cited in the file of this patent

UNITED STATES PATENTS

| | | |
|---|---|---|
| 2,388,070 | Middel | Oct. 30, 1945 |
| 2,424,977 | Grieg | Aug. 5, 1947 |
| 2,428,118 | Labin et al. | Sept. 30, 1947 |
| 2,444,726 | Bussey | July 6, 1948 |
| 2,509,864 | Hedstrom | May 30, 1950 |
| 2,740,086 | Evans et al. | Mar. 27, 1956 |
| 2,773,133 | Dunnet | Dec. 4, 1956 |
| 2,780,782 | Bright | Feb. 5, 1957 |
| 2,795,656 | Hirsch | June 11, 1957 |
| 2,816,260 | Scorgie | Dec. 10, 1957 |
| 2,827,603 | Fingerett et al. | Mar. 18, 1958 |
| 2,882,352 | Rote | Apr. 14, 1959 |
| 2,884,599 | Van Deinse | Apr. 28, 1959 |
| 2,897,293 | Morgan et al. | July 28, 1959 |

OTHER REFERENCES

Geyger text, "Magnetic Amplifier Circuits," pp. 219–221, published Jan. 29, 1954.